US008124158B2

(12) United States Patent
Oonishi et al.

(10) Patent No.: US 8,124,158 B2
(45) Date of Patent: Feb. 28, 2012

(54) FAT-IN-OIL COMPOSITION, AND OIL-IN-WATER EMULSIFIED PRODUCT CONTAINING THE FAT-AND-OIL COMPOSITION

(75) Inventors: Kiyomi Oonishi, Kanagawa (JP); Yoshiyuki Hatano, Kanagawa (JP); Hirofumi Haruna, Kanagawa (JP); Yuka Kikuchi, Kanagawa (JP); Akira Sato, Kanagawa (JP); Hiroki Kannari, Kanagawa (JP); Masayuki Sato, Kanagawa (JP)

(73) Assignee: The Nisshin Oillio Group, Ltd., Tokyo (JP)

( * ) Notice: Subject to any disclaimer, the term of this patent is extended or adjusted under 35 U.S.C. 154(b) by 0 days.

(21) Appl. No.: 13/003,801

(22) PCT Filed: Jan. 29, 2009

(86) PCT No.: PCT/JP2009/051420
§ 371 (c)(1),
(2), (4) Date: Jan. 12, 2011

(87) PCT Pub. No.: WO2010/007802
PCT Pub. Date: Jan. 21, 2010

(65) Prior Publication Data
US 2011/0117261 A1 May 19, 2011

(30) Foreign Application Priority Data

Jul. 16, 2008 (JP) .................................. 2008-184389
Sep. 19, 2008 (JP) .................................. 2008-241226

(51) Int. Cl.
*A23C 9/154* (2006.01)
(52) U.S. Cl. ......... 426/580; 426/570; 426/585; 426/606
(58) Field of Classification Search .................. 426/570, 426/585, 606
See application file for complete search history.

(56) References Cited

U.S. PATENT DOCUMENTS

| 4,533,561 | A | 8/1985 | Ward |
| 4,610,889 | A | 9/1986 | Schmidt |
| 6,156,370 | A | 12/2000 | Huizinga et al. |
| 6,497,914 | B1 | 12/2002 | Hidaka et al. |
| 6,808,737 | B2 | 10/2004 | Ullanoormadam |

FOREIGN PATENT DOCUMENTS

| JP | 63-014675 | 1/1988 |
| JP | 05-030911 | 2/1993 |
| JP | 5-219887 | 8/1993 |
| JP | 05-219887 | 8/1993 |
| JP | 06-141808 | 5/1994 |
| JP | 07-194330 | 8/1995 |
| JP | 10-075729 | 3/1998 |
| JP | 10-155448 | 6/1998 |
| JP | 2000-041609 A | 2/2000 |
| JP | 2002-034450 | 2/2002 |
| JP | 2003-325104 | 11/2003 |
| JP | 2008-086268 | 4/2008 |

OTHER PUBLICATIONS

International Search Report for PCT/JP2009/051420, mailed Apr. 28, 2009.
English translations, with certification, of the tables in JP 2008-086268A and JP 05-219887A.
Executed declaration of Shozo Sakaguchi (translator) dated Oct. 28, 2010 with English translations of Tables in JP 05-219887A (pp. 3/6, 4/6 upper, 4/6 middle, 4/6 last, 5/6 upper, 5/6 middle, 5/6 last), JP 06-141808A (Table 1, Table 2), JP2000-041609A (Table 1, Table 2, Table 3) and JP 07-194330A (Table 1).
International Search Report for PCT/JP2009/051419, mailed Apr. 28, 2009.

*Primary Examiner* — Elizabeth Gwartney
(74) *Attorney, Agent, or Firm* — Nixon & Vanderhye P.C.

(57) ABSTRACT

Fat-and-oil composition comprising fat-and-oil A (foA), foB, foD and optional foE as defined below and meeting the following conditions: FoA; fat-and-oil including lauric fat-and-oil, etc., FoB; transesterified oil of foC wherein the contents of saturated and unsaturated fatty acids having 16 or more carbon atoms are in specific ranges, respectively, FoD; fat-and-oil containing XOX-type triacyl glycerols in a content of 30% by mass or more, FoE; fat-and-oil ingredient which is derived from vegetable fats and oils and does not belong to any of foA, foB and foD; in all the fat-and-oil ingredients derived from vegetable fats and oils, the contents % by mass of foA, foB and XOX-type triacyl glycerols are 1 to 4, 10 to 20, and 40 or more but less than 60, respectively; and oil-in-water emulsified product containing the composition.

10 Claims, No Drawings

FAT-IN-OIL COMPOSITION, AND OIL-IN-WATER EMULSIFIED PRODUCT CONTAINING THE FAT-AND-OIL COMPOSITION

This application is the U.S. national phase of International Application No. PCT/JP2009/051420, filed 29 Jan. 2009, which designated the U.S. and claims priority to Japan Application No. 2008-184389, filed 16 Jul. 2008; and Japan Application No. 2008-241226, filed 19 Sep. 2008, the entire contents of each of which are hereby incorporated by reference.

TECHNICAL FIELD

This invention relates to a fat-and-oil composition which can suitably be used for preparation of an oil-in-water emulsified product which is used as a cream, particularly whipping cream mainly in the confectionery and bread-making fields.

This invention also relates, among oil-in-water emulsified products used as creams, particularly whipping creams mainly in the confectionery and bread-making fields, to an oil-in-water emulsified product which contains substantially no trans fatty acid, has high emulsification stability even in a high fat-and-oil content, and is good in whipping characteristics such as melting mouthfeel, foaming properties, shape-retaining properties and dripping of water.

BACKGROUND ART

As an oil-in-water emulsified product used as cream, particularly whipping cream used mainly in the confectionery and bread-making fields, natural fresh cream, which is manufactured by separating milk fat from raw milk, has hitherto been used. However, although fresh cream is excellent in such a degree that there is no analog in respect of flavor, in an emulsion state before whipping, sudden rise of the viscosity or solidification so-called bate is liable to occur due to rise of the temperature thereof during preservation or vibration during transportation, and there has been difficulty in the aspect of its handling. Furthermore, fresh cream has had such problems that the quality of raw milk as its raw material is liable to change depending on seasons, and it is expensive.

Therefore, as oil-in-water emulsified products which are comparatively inexpensive, easy to obtain and comparatively stable in quality, there have been developed compound-type oil-in-water emulsified products wherein part of the milk fat is replaced with vegetable fats-and-oils, and vegetable-type oil-in-water emulsified products wherein all of the milk fat is replaced with vegetable fats-and-oils.

As vegetable fats-and-oils used in vegetable-type oil-in-water emulsified products, there can be mentioned lauric fats-and-oils containing much lauric acid as a saturated fatty acid having 12 carbon atoms such as coconut oil and palm kernel oil; vegetable fats-and-oils containing much fatty acids having 16 or more carbon atoms such as and palm oil and rapeseed oil, and hardened oils and fractionated oils of these vegetable fats-and-oils; and mixed oils of these fats-and-oils; etc.

Oil-in-water emulsified products obtained using only lauric fats-and-oils exhibit very good melting mouthfeel, but they have a problem that their viscosity tends to rise due to temperature change, and it is difficult to maintain a moderate foaming state and hardness suitable for work. As to oil-in-water emulsified products obtained using only lauric fats-and-oils, their preparation becomes possible when their fat content is made to be low, but problems have yet remained that when they are used as cream, particularly whipping cream, they are brittle, and poor in shape-retaining properties, and so on as the physical properties of whipped cream after whipping.

On the other hand, since oil-in-water emulsified products obtained by using together lauric fats-and-oils and hardened oils of vegetable fats-and-oils containing much fatty acids having 16 or more carbon atoms such as palm oil or rapeseed oil have good balance of melting mouthfeel, emulsification stability and shape-retaining properties, they have hitherto widely been used as cream, particularly whipping cream (e.g., see Patent Documents 1 and 2).

However, in recent years, a theory has appeared that trans fatty acids contained in hardened oils are nutritionally undesirable, fat-and-oil-containing foods of a reduced trans fatty acid content have socially come to be claimed, and, for example, in U.S.A., it is obligatory to make an indication on foods containing trans fatty acids in an amount exceeding a certain standard. Therefore, also as to oil-in-water emulsified products used as cream, particularly whipping cream, it has come to be claimed not to use hardened oils of vegetable fats-and-oils containing trans fatty acids.

As an oil-in-water emulsified product substantially containing no trans fatty acid, one wherein a lauric fat-and-oil and a middle-melting fractionated oil of palm oil are used together, or the like is conceived (e.g., see Patent Document 3).

However, although an oil-in-water emulsified product obtained by using together a lauric fat-and-oil and a middle-melting fractionated oil of palm oil contains substantially no trans fatty acid, when the oil-in-water emulsified product is one having a high fat-and-oil content (i.e., one containing much fat-and-oil), it has a problem, particularly in emulsification stability, and could not be satisfactory in practical use. Thus, although an oil-in-water emulsified product of a high fat-and-oil content, i.e., containing much fat-and-oil, used as cream, particularly whipping cream, is very advantageous in the aspect of good taste, it has yet been unsatisfactory in respect of quality.

Therefore, development of an oil-in-water emulsified product containing substantially no trans fatty acid, having a high fat-and-oil content but nevertheless having high emulsification stability, and being good in whipping characteristics such as melting mouthfeel, foaming properties and shape-retaining properties has been desired.

Patent Document 1: JP 10-075729 A
Patent Document 2: JP 2002-034450 A
Patent Document 3: JP 05-219887 A

DISCLOSURE OF INVENTION

Problems To Be Solved By the Invention

The object of this invention is to provide a fat-and-oil composition suitable as a fat-and-oil composition used in oil-in-water emulsified products which are used as cream, particularly whipping cream mainly in the confectionery and bread-making fields, and an oil-in-water emulsified product which contains substantially no trans fatty acid, has high emulsification stability even in a high fat-and-oil content, and is good in whipping characteristics such as melting mouthfeel, foaming properties, shape-retaining properties and dripping of water.

Means For Solving the Problems

The present inventors have intensely studied for solving the above problems, and as a result, they found that, by using a fat-and-oil composition which comprises a lauric fat-and-oil and a transesterified oil having a specific fatty acid composition and wherein the content of XOX-type triacyl glycerols (X: a saturated fatty acid having 16 or more carbon atoms, O: oleic acid) is a specific amount for preparation of oil-in-water emulsified products used as cream, particularly whipped cream, an oil-in-water emulsified product can be obtained which contains substantially no trans fatty acid, has high emulsification stability even in a high fat-and-oil content, and is good in whipping characteristics such as melting mouth-feel, foaming properties, shape-retaining properties and dripping of water, and completed the invention.

Namely, the invention relates to a fat-and-oil composition comprising a fat-and-oil A, a fat-and-oil B, a fat-and-oil D and an optional fat-and-oil E as defined below and meeting the following conditions (a) to (c), in which composition, fat-and-oil E is an optional ingredient and becomes the residual fat-and-oil ingredient when the total content of fat-and-oil A, fat-and-oil B and fat-and-oil D in all the fat-and-oil ingredients derived from vegetable fats-and-oils is less than 100% by mass:

Fat-and-oil A: at least one fat-and-oil which is selected from the group consisting of lauric fats-and-oils, fractionated oils of lauric fats-and-oils, extremely hardened oils of lauric fats-and-oils, and transesterified oils each of which is obtained by subjecting to transesterification reaction a fat-and-oil containing at least one fat-and-oil of lauric fats-and-oils, fractionated oils of lauric fats-and-oils and extremely hardened oils of lauric fats-and-oils, and wherein the content of lauric acid in all the constitutive fatty acids is 15 to 60% by mass, Fat-and-oil B: a transesterified oil obtained by subjecting the following fat-and-oil C to transesterification reaction, Fat-and-oil C: a fat-and-oil wherein the content of saturated fatty acids having 16 or more carbon atoms in all the constitutive fatty acids is 20% by mass or more but less than 75% by mass, and the content of unsaturated fatty acids having 16 or more carbon atoms in all the constitutive fatty acids is 25% by mass or more but less than 70% by mass, and Fat-and-oil D: a fat-and-oil which contains XOX-type triacyl glycerols in a content of 30% by mass or more (XOX-type triacyl glycerol: a triacyl glycerol wherein the fatty acids at the 1-position and the 3-position of the triacyl glycerol are X and the fatty acid at the 2-position is O; X: a saturated fatty acid having 16 or more carbon atoms, O: oleic acid), and Fat-and-oil E: a fat-and-oil ingredient which is derived from vegetable fats-and-oils and does not belong to any of fat-and-oil A, fat-and-oil B and fat-and-oil D, (a) the content of fat-and-oil A in all the fat-and-oil ingredients derived from vegetable fats-and-oils is 1 to 4% by mass, (b) the content of fat-and-oil B in all the fat-and-oil ingredients derived from vegetable fats-and-oils is 10 to 20% by mass, and (c) the content of XOX-type triacyl glycerols in all the fat-and-oil ingredients derived from vegetable fats-and-oils is 40% by mass or more but less than 60% by mass In the above, the transesterified oil obtained by subjecting to transesterification reaction an fat-and-oil containing at least one fat-and-oil of lauric fats-and-oils, fractionated oils of lauric fats-and-oils and extremely hardened oils of lauric fats-and-oil includes a transesterified oil obtained by subjecting to transesterification reaction at least one fat-and-oil of lauric fats-and-oils, fractionated oils of lauric fats-and-oils and extremely hardened oils of lauric fats-and-oil, and a transesterified oil obtained by subjecting to transesterification reaction a mixed oil of at least one fat-and-oil of lauric fats-and-oils, fractionated oils of lauric fats-and-oils and extremely hardened oils of lauric fats-and-oil with another fat-and-oil.

In the oil-in-water emulsified product of the invention containing the above fat-and-oil composition, fat-and-oil A mainly contributes to inhibition of dripping of water and good shape-retaining properties, fat-and-oil B mainly contributes to good emulsification stability, and XOX-type triacyl glycerols mainly contribute to good emulsification stability and good shape-retaining properties.

As preferred examples of fat-and-oil C, there can be mentioned fractionated oils of palm oil, having an iodine value of 55 to 71. The fat-and-oil composition of the invention is particularly suitable for preparation of cream.

The above fat-and-oil composition can contain milk fat so that the content of milk fat in all the fat-and-oil ingredients in the fat-and-oil composition can be 10 to 90% by mass.

The invention also relates to an oil-in-water emulsified product which contains the above fat-and-oil composition and wherein the proportion of trans fatty acids in all the constitutive fatty acids of all the fat-and-oil ingredients in the oil-in-water emulsified product is less than 5% by mass. The oil-in-water emulsified product can contain milk fat, and in the occasion, it is preferred that, in all the fat-and-oil ingredients in the oil-in-water emulsified product, the total content of fat-and-oil ingredients derived from vegetable fats-and-oils is 10 to 90% by mass, and the content of the milk fat is 10 to 90% by mass. In either of the above oil-in-water emulsified products, the content of all the fat-and-oil ingredients can be more than 40% by mass. The oil-in-water emulsified product is preferably cream, and particularly preferably whipping cream.

The invention also relates to a food using the above oil-in-water emulsified product.

Effect of the Invention

According to the invention, there can be provided a fat-and-oil composition suitably usable for preparation of, among oil-in-water emulsified products which are used as a cream, particularly whipping cream mainly in the confectionery and bread-making fields, an oil-in-water emulsified product which contains substantially no trans fatty acid, has high emulsification stability even in a high fat-and-oil content, and is good in whipping characteristics such as melting mouth-feel, foaming properties, shape-retaining properties and dripping of water.

According to the invention, there can also be provided, among oil-in-water emulsified products which are used as a cream, particularly whipping cream mainly in the confectionery and bread-making fields, an oil-in-water emulsified product which contains substantially no trans fatty acid, has high emulsification stability even in a high fat-and-oil content, and is good in whipping characteristics such as melting mouth-feel, foaming properties, shape-retaining properties and dripping of water.

BEST MODE FOR CARRYING OUT THE INVENTION

The invention is described in detail below.
First, the fat-and-oil composition of the invention is described.
The fat-and-oil composition of the invention is a fat-and-oil composition comprising a fat-and-oil A, a fat-and-oil B, a fat-and-oil D and an optional fat-and-oil E as defined below and meeting the following conditions (a) to (c), in which composition, fat-and-oil E is an optional ingredient and becomes the residual fat-and-oil ingredient when the total content of fat-and-oil A, fat-and-oil B and fat-and-oil D in all the fat-and-oil ingredients derived from vegetable fats-and-oils is less than 100% by mass:

Fat-and-oil A: at least one fat-and-oil which is selected from the group consisting of lauric fats-and-oils, fractionated oils of lauric fats-and-oils, extremely hardened oils of lauric fats-and-oils, and transesterified oils each of which is obtained by subjecting to transesterification reaction an fat-and-oil containing at least one fat-and-oil of lauric fats-and-oils, fractionated oils of lauric fats-and-oils and extremely hardened oils of lauric fats-and-oils, and wherein the content of lauric acid in all the constitutive fatty acids is 15 to 60% by mass, Fat-and-oil B: a transesterified oil obtained by subjecting the following fat-and-oil C to transesterification reaction, Fat-and-oil C: a fat-and-oil wherein the content of saturated fatty acids having 16 or more carbon atoms in all the constitutive fatty acids being 20% by mass or more but less than 75% by mass, and the content of unsaturated fatty acids having 16 or more carbon atoms in all the constitutive fatty acids being 25% by mass or more but less than 70% by mass, and Fat-and-oil D: a fat-and-oil which contains XOX-type triacyl glycerols in a content of 30% by mass or more (XOX-type triacyl glycerol: a triacyl glycerol wherein the fatty acids at the 1-position and the 3-position of the triacyl glycerol are X and the fatty acid at the 2-position is O; X: a saturated fatty acid having 16 or more carbon atoms, O: oleic acid), and Fat-and-oil E: a fat-and-oil ingredient which is derived from vegetable fats-and-oils and does not belong to any of fat-and-oil A, fat-and-oil B and fat-and-oil D, (a) the content of fat-and-oil A in all the fat-and-oil ingredients derived from vegetable fats-and-oils is 1 to 4% by mass, (b) the content of fat-and-oil B in all the fat-and-oil ingredients derived from vegetable fats-and-oils is 10 to 20% by mass, and (c) the content of XOX-type triacyl glycerols in all the fat-and-oil ingredients derived from vegetable fats-and-oils is 40% by mass or more but less than 60% by mass.

In the invention, the fat-and-oil ingredients derived from vegetable fats-and-oils include not only vegetable fats-and-oils themselves but also fats-and-oils obtained by subjecting vegetable fats-and-oils as raw materials to processing treatments such as fractionation, hydrogenation and transesterification. Fat-and-oil A, fat-and-oil B, fat-and-oil D and fat-and-oil E used as fat-and-oil ingredients of the fat-and-oil composition as described later, and fat-and-oil C used for preparation of fat-and-oil B are fat-and-oil ingredients derived from vegetable fats-and-oils.

The total content of fat-and-oil ingredients derived from vegetable fats-and-oils, in all the fat-and-oil ingredients in the fat-and-oil composition can be 10 to 100% by mass, and is preferably 10 to 90% by mass, more preferably 30 to 90% by mass and still more preferably 50 to 90% by mass.

In the invention, the phrase "all the fat-and-oil ingredients derived from vegetable fats-and-oils" means the total of the contained fat-and-oil ingredients derived from vegetable fats-and-oils. Furthermore, in the invention, the phrase "all the fat-and-oil ingredients" means the total of the contained all of fat-and-oil ingredients.

As fat-and-oil A which is a raw material fat-and-oil of the fat-and-oil composition of the invention, there can be used at least one fat-and-oil selected from the group consisting of lauric fats-and-oils, fractionated oils of lauric fats-and-oils and extremely hardened oils of lauric fats-and-oils, and transesterified oils each of which is obtained by subjecting to transesterification reaction an fat-and-oil containing at least one fat-and-oil of lauric fats-and-oils, fractionated oils of lauric fats-and-oils and extremely hardened oils of lauric fats-and-oils.

Lauric fats-and-oils are a general term of fat-and-oils whose constitutive fatty acids are rich in lauric acid which is a saturated fatty acid having 12 carbon atoms. As the lauric fats-and-oils, there can be mentioned coconut oil, palm kernel oil, etc. As fat-and-oil A, there can also be used a fractionated oil of a lauric fat-and-oil obtained by fractionating a lauric fat-and-oil, an extremely hardened oil obtained by extremely hydrogenating a lauric fat-and-oil (the hardened oil does not substantially contain any trans fatty acid), e.g., an extremely hardened oil of palm kernel oil. As fat-and-oil A, there can further be used a transesterified oil which is obtained by subjecting to transesterification reaction an fat-and-oil containing at least one fat-and-oil of lauric fats-and-oils, fractionated oils of lauric fats-and-oils and extremely hardened oils of lauric fats-and-oils. In this connection, the fat-and-oil containing at least one fat-and-oil of lauric fats-and-oils, fractionated oils of lauric fats-and-oils and extremely hardened oils of lauric fats-and-oils includes at least one fat-and-oil of lauric fats-and-oils, fractionated oils of lauric fats-and-oils and extremely hardened oils of lauric fats-and-oils, and a mixed oil of at least one fat-and-oil of lauric fats-and-oils, fractionated oils of lauric fats-and-oils and extremely hardened oils of lauric fats-and-oils with another oil. The said another oil is not particularly restricted, and includes, for example, palm oil, extremely hardened oils of palm oil, fractionated oils of palm oil (palmstearin, etc.), extremely hardened oils of fractionated oils of palm oil (extremely hardened oils of palmstearin, etc.), extremely hardened oils of soybean oil, extremely hardened oils of rapeseed oil, etc. Preferred among them are extremely hardened oils of palm oil. In the case of the mixed oil of at least one fat-and-oil of lauric fats-and-oils, fractionated oils of lauric fats-and-oils and extremely hardened oils of lauric fats-and-oils with another oil, the mixing ratio of both is preferably 80:20 to 20:80, more preferably 70:30 to 30:70 and still more preferably 60:40 to 40:60 as at least one fat-and-oil of lauric fats-and-oils, fractionated oils of lauric fats-and-oils and extremely hardened oils of lauric fats-and-oils another oil. As a preferred combination of at least one fat-and-oil of lauric fats-and-oils, fractionated oils of lauric fats-and-oils and extremely hardened oils of lauric fats-and-oils with another oil, there can be mentioned a combination of an extremely hardened oil of palm kernel oil with an extremely hardened oil of palm oil.

The content of lauric acid in all the constitutive fatty acids of fat-and-oil A in the invention needs to be 15% by mass or more, and is preferably 20% by mass or more. There is no particular restriction on the upper limit of the lauric acid content, but the upper limit is at most on the order of 60% by mass, and more actually on the order of 50% by mass, taking availability, etc. into account By compounding of fat-and-oil A, oil-in-water emulsified products obtained using the fat-and-oil composition of the invention, particularly whipping cream become such that dripping of water is inhibited and shape-retaining properties become good.

Fat-and-oil B as a raw material fat-and-oil of the fat-and-oil composition of the invention is a transesterified oil obtained by subjecting the following fat-and-oil C to transesterification reaction. When fat-and-oil B is compounded in the fat-and-oil composition of the invention, fat-and-oil B mainly contributes to good emulsification stability in the oil-in-water emulsified product of the invention.

Fat-and-oil C is a fat-and-oil wherein the content of saturated fatty acids having 16 or more carbon atoms in all the constitutive fatty acids being 20% by mass or more but less than 75% by mass, and the content of unsaturated fatty acids having 16 or more carbon atoms in all the constitutive fatty acids being 25% by mass or more but less than 70% by mass, The content of saturated fatty acids having 16 or more carbon atoms in all the constitutive fatty acids is preferably 25% by mass or more but less than 70% by mass, and still more preferably 30% by mass or more but less than 70% by mass. The content of unsaturated fatty acids having 16 or more carbon atoms in all the constitutive fatty acids is preferably 25% by mass or more but less than 65% by mass, and still more preferably 30% by mass or more but less than 65% by mass.

When as to fat-and-oil C, the condition that the content of saturated fatty acids having 16 or more carbon atoms in all the constitutive fatty acids is 20% by mass or more but less than 75% by mass, and the content of unsaturated fatty acids having 16 or more carbon atoms in all the constitutive fatty acids is 25% by mass or more but less than 70% by mass is met, the formation amount of triacyl glycerols of three saturated fatty acids (triacyl glycerols wherein all of the three fatty acids bonded to glycerol are saturated fatty acids) in the resulting fat-and-oil composition is inhibited, and as a result, the resulting oil-in-water emulsified product comes to have good melting mouthfeel without wax feeling, the resulting fat-and-oil composition comes to have good oxidation stability, and the resulting oil-in-water emulsified product comes to have good flavor.

As specific examples of fat-and-oil C, there can be mentioned palm oil, fractionated oils of palm oil obtained by subjecting palm oil to a fractionation treatment (natural fractionation, solvent fractionation, fractionation with a surfactant or the like). Fat-and-oil C can be used solely or as a mixture of two or more so long as the condition of the content of each of the above saturated fatty acids and unsaturated fatty acids is met. As fat-and-oil C, a fractionated oil of palm oil having an iodine value of 55 to 71 (sometimes referred to as palmolein) is preferred.

When fat-and-oil B obtained by subjecting palm oil or a fractionated oil of palm oil to transesterification reaction is used, the emulsification stability of the resulting oil-in-water emulsified product becomes better.

When fat-and-oil B obtained by subjecting a fractionated oil of palm oil having an iodine value of 55 to 71 to transesterification reaction is used, the emulsification stability and melting mouthfeel of the resulting oil-in-water emulsified product becomes better.

Fat-and-oil D as a raw material fat-and-oil of the fat-and-oil composition of the invention is a fat-and-oil containing XOX-type triacyl glycerols in a content of 30% by mass or more (XOX-type triacyl glycerol: a triacyl glycerol wherein the fatty acids at the 1-position and the 3-position of the triacyl glycerol are X and the fatty acid at the 2-position is O; X: a saturated fatty acid having 16 or more carbon atoms, O: oleic acid). Fat-and-oil D is used for the purpose of maintaining the content of XOX-type triacyl glycerols in all the fat-and-oil ingredients in the fat-and-oil composition of the invention in a specific range (40% by mass or more but less than 60% by mass).

X needs to be a saturated fatty acid having 16 or more carbon atoms, and is preferably a saturated fatty acid having 16 to 22 carbon atoms and more preferably a saturated fatty acid having 16 to 18 carbon atoms. Specifically, palmitic acid, stearic acid, behenic acid, etc. are mentioned.

The content of XOX-type triacyl glycerols in fat-and-oil D needs to be 30% by mass or more, and is preferably 40% by mass or more and more preferably 50% by mass or more. There is no particular restriction on the upper limit of the content of XOX-type triacyl glycerols in fat-and-oil D, but the upper limit is actually on the order of 80% by mass taking availability, etc. into account.

As specific examples of fats-and-oils each containing XOX-type triacyl glycerols in a content of 30% by mass or more, there can be mentioned palm oil, fractionated oils of palm oil (palmolein, super olein), middle-melting fractionated oils of palm oil (PMF, hard PMF), etc. Fats-and-oils each containing XOX-type triacyl glycerols in a content of 30% by mass or more can be used solely or in a combination of two or more. Middle-melting fractionated oils of palm oil are preferably such that their solid fat content is 60% or more but less than 100% at 10° C., 30% or more but less than 90% at 20° C. and less than 5% at 35° C.

Fat-and-oil E as a raw material fat-and-oil of the fat-and-oil composition of the invention is a fat-and-oil ingredient which is derived from vegetable fats-and-oils and does not belong to any of fat-and-oil A, fat-and-oil B and fat-and-oil D. Fat-and-oil E is an optional ingredient and becomes the residual fat-and-oil ingredient when the total content of fat-and-oil A, fat-and-oil B and fat-and-oil D in all the fat-and-oil ingredients derived from vegetable fats-and-oils in the fat-and-oil composition of the invention is less than 100% by mass. As specific examples of fat-and-oil E, there can be mentioned rapeseed oil, corn oil, fractionated oils of palm oil having an iodine value of 63 to 75, etc.

The fat-and-oil composition of the invention can contain milk fat.

Next, the contents of each fat-and-oil and triacyl glycerols in the fat-and-oil composition of the invention are described.

The content of fat-and-oil A in all the fat-and-oil ingredients derived from vegetable fats-and-oils in the fat-and-oil composition of the invention needs to be 1 to 4% by mass, and is preferably 2 to 4% by mass. When the content of fat-and-oil A is within the above range, dripping of water is inhibited and shape-retaining properties come to be good.

The content of fat-and-oil B in all the fat-and-oil ingredients derived from vegetable fats-and-oils in the fat-and-oil composition of the invention needs to be 10 to 20% by mass, and is preferably 10 to 15% by mass. When the content of fat-and-oil B is within the above range, high emulsification stability can be obtained.

The content of XOX-type triacyl glycerols in all the fat-and-oil ingredients derived from vegetable fats-and-oils in the fat-and-oil composition of the invention needs to be 40% by mass or more but less than 60% by mass, and is preferably 40 to 55% by mass and more preferably 40 to 50% by mass. When the content of XOX-type triacyl glycerols is within the above range, high emulsification stability can be obtained and shape-retaining properties come to be good. XOX-type triacyl glycerols are mainly supplied from fat-and-oil D.

Fat-and-oil E which the fat-and-oil composition of the invention can contain as an optional fat-and-oil ingredient becomes the residual fat-and-oil ingredient when the total content of fat-and-oil A, fat-and-oil B and fat-and-oil D in all the fat-and-oil ingredients derived from vegetable fats-and-oils in the fat-and-oil composition of the invention is less than 100% by mass. The content of fat-and-oil E in all the fat-andoil ingredients derived from vegetable fats-and-oils in the fat-and-oil composition of the invention is preferably 30% by mass or less, more preferably 7% by mass or less and still more preferably 1% by mass or less.

The content of X2O-type triacyl glycerols in all the fat-and-oil ingredients derived from vegetable fats-and-oils in the fat-and-oil composition of the invention is preferably 44% by mass or more but less than 68% by mass, more preferably 44% by mass or more but less than 60% by mass and still more preferably 48% by mass or more but less than 55% by mass. The content of X2O-type triacyl glycerols means the total of the content of XOX-type triacyl glycerols and the content of XXO-type triacyl glycerols. XXO-type triacyl glycerols mean triacyl glycerols wherein the fatty acids at the 1- and 2-positions or at the 2- and 3-positions are X and the fatty acid at the 3- or 1-position is O (X and O are as defined in XOX-type triacyl glycerols).

The ratio of the content of XXO-type triacyl glycerols to the content of X2O-type triacyl glycerols in all the fat-and-oil ingredients derived from vegetable fats-and-oils in the fat-and-oil composition of the invention (XXO/X2O) is preferably 0.11 or more but less than 0.15, and more preferably 0.12 to 0.14.

When the fat-and-oil composition of the invention contains milk fat, the content of milk fat in all the fat-and-oil ingredients is preferably 10 to 90% by mass, more preferably 10 to 70% by mass and still more preferably 10 to 50% by mass. In this case, the total content of fat-and-oil ingredients derived from vegetable fats-and-oils in all the fat-and-oil ingredients in the fat-and-oil composition is preferably 10 to 90% by mass, more preferably 30 to 90% by mass and still more preferably 50 to 90% by mass.

The content of solid fats (solid fat content) in all the fat-and-oil ingredients derived from vegetable fats-and-oils in the fat-and-oil composition of the invention is preferably 60 to 90% at 10° C., 40 to 80% at 15° C. and 1 to 10% at 30° C., more preferably 60 to 80% at 10° C., 40 to 70% at 15° C. and 1 to 8% at 30° C. and still more preferably 60 to 70% at 10° C., 40 to 60% at 15° C. and 4 to 8% at 30° C. When the solid fat content is within the necessary range, the resulting oil-in-water emulsified product comes to have good melting mouthfeel and good shape-retaining properties.

A solid fat content can be measured, for example according to 2.2.9-2003 Solid Fat Content (NMR method) of "Kijun Yushi Bunseki Shikenho" (Standard Methods for the Analysis of Fats, Oils and Related Materials) edited by a corporate juridical person Japan Oil Chemists' Society.

The proportion of trans fatty acids in all the constitutive fatty acids of all the fat-and-oil ingredients in the fat-and-oil composition of the invention is preferably less than 5% by mass, more preferably less than 3% by mass, still more preferably less than 1% by mass and most preferably 0% by mass, from the viewpoint that oil-in-water emulsified products using the fat-and-oil composition of the invention do not contain trans fatty acids in a substantial amount.

The content of lauric acid in all the constitutive fatty acids of all the fat-and-oil ingredients derived from vegetable fats-and-oils in the fat-and-oil composition of the invention is preferably 0.2 to 2% by mass, more preferably 0.3 to 2% by mass, still more preferably 0.5 to 2% by mass and most preferably 1 to 2% by mass, The fat-and-oil composition of the invention usually does not contain other ingredients than fats-and-oils, but, so long as the effects of the invention are not spoiled, it can contain other ingredients than fats-and-oils such as an emulsifier and an antioxidant in a small content, preferably in a content of less than 5% by mass, more preferably in a content of less than 3% by mass and still more preferably in a content of less than 1% by mass. As the emulsifier, there can be used the same emulsifiers as in those used as an optional ingredient in the oil-in-water emulsified product of the invention which is described later. As the antioxidant, there can, for example, be mentioned tocopherols, ascorbic acid fatty acid esters, tea extracts, rutin, etc.

The transesterification reaction used to obtain transesterified oils in fat-and-oil A, fat-and-oil B can be either of chemical transesterification reaction and enzymatic transesterification reaction.

The chemical transesterification reaction is a transesterification reaction which is carried out using a chemical catalyst such as sodium methylate, and is poor in positional specificity (also referred to as random transesterification).

The chemical transesterification reaction can be carried out according to a conventional method, for example, by sufficiently drying a raw material fat-and-oil, adding a catalyst in an amount of 0.1 to 1% by mass based on the raw material fat-and-oil, and, then, stirring the mixture at 80 to 120° C. under reduced pressure for 0.5 to 1 hour. After completion of the transesterification reaction, the catalyst is washed away by water washing, and the resulting transesterified oil can be subjected to decolorization and/or deodorization treatment(s) as carried out in usual purification steps of edible oils.

The enzymatic transesterification reaction is carried out using lipase as a catalyst.

As the lipase, there can be used lipase powder or an immobilized lipase obtained by immobilizing lipase powder on a carrier such as Celite or an ion exchange resin. The transesterification reaction by enzymatic transesterification can be transesterification reaction poor in positional specificity or transesterification reaction rich in 1,3-position positional specificity, depending on the kind of lipase.

As lipases capable of carrying out transesterification reaction poor in positional specificity, there can be mentioned lipase derived from a microorganism which belongs to the genus Alcaligenes (e.g., lipase QLM and lipase PL made by Meito Sangyo Co., Ltd., etc.), lipase derived from a microorganism which belongs to the genus Candida (e.g., lipase OF made by Meito Sangyo Co., Ltd., etc.), etc.

As lipases capable of carrying out transesterification reaction rich in 1,3-position positional specificity, there can be mentioned immobilized lipase derived from a microorganism which belongs to the species Rhizomucor miehei (e.g., Lipozyme TLIM and Lipozyme RMIM made by Novozymes Co., etc.), etc.

The enzymatic transesterification reaction can, for example, be carried out by adding lipase powder or an immobilized lipase in an amount of 0.02 to 10% by mass, preferably 0.04 to 5% by mass based on a raw material fat-and-oil, and, then, stirring the mixture at 40 to 80° C., preferably 40 to 70° C. for 0.5 to 48 hours, preferably 0.5 to 24 hours. After completion of the transesterification reaction, the lipase powder or immobilized lipase is removed by filtration or the like, and the resulting transesterified oil can be subjected to decolorization and/or deodorization treatment(s) as carried out in usual purification steps of edible oils.

It is preferred that the transesterification reaction is carried out as transesterification reaction poor in positional specificity. When it is carried out as transesterification reaction poor in positional specificity, the emulsification stability of the resulting oil-in-water emulsified product becomes better.

The degree of progress of transesterification reaction in the transesterification reaction poor in positional specificity can, for example, be expressed by randomization proportion. The randomization proportion shows that the higher the value is, the poorer in positional specificity the transesterification reaction is, but, in the invention, the randomization proportion is used as an index to express the degree of progress of the transesterification reaction. The randomization proportion can be calculated from the fatty acid composition of all the constitutive fatty acids constituting the triacyl glycerols of a fat-and-oil (according to AOCS Celf-96) and the fatty acid composition constituting the 2-position of the triacyl glycerols of the fat-and-oil (according to AOCS Ch3-91) before and after the transesterification reaction. The randomization proportion can be calculated using, as an index, among fatty acid compositions, particularly palmitic acid which is a saturated fatty acid having 16 carbon atoms.

Randomization proportion (%)=(the proportion of palmitic acid in all the constitutive fatty acids constituting the 2-position of the triacyl glycerols after the transesterification reaction−the proportion of palmitic acid in all the constitutive fatty acids constituting the 2-position of the triacyl glycerols before the transesterification reaction)/(the proportion of palmitic acid in all the constitutive fatty acids constituting the triacyl glycerols−the proportion of palmitic acid in all the constitutive fatty acids constituting the 2-position of the triacyl glycerols before the transesterification reaction)×100.

The randomization proportion in the transesterification reaction is preferably 30% or more, more preferably 60% or more, and still more preferably 90% or more, namely 90 to 100%.

The fat-and-oil composition of the invention can suitably be used as a fat-and-oil used for preparation of oil-in-water emulsified products, for example creams (particularly, whipping creams), coffee whiteners, ice creams, etc. The fat-and-oil composition of the invention can particularly suitably be used as a fat-and-oil used for preparation of creams (particularly, whipping creams).

The oil-in-water emulsified product of the invention is now described below.

The oil-in-water emulsified product of the invention is characterized in containing the fat-and-oil composition of the invention. The oil-in-water emulsified product of the invention can contain only fat-and-oil ingredients derived from the fat-and-oil composition of the invention, or can contain another fat-and-oil, as a fat-and-oil ingredient other than fat-and-oil ingredients derived from the fat-and-oil composition of the invention.

The oil-in-water emulsified product of the invention can, also, contain only fat-and-oil ingredients derived from vegetable fats-and-oils, or can contain fat-and-oil ingredients derived from vegetable fats-and-oils, and milk fat.

When the oil-in-water emulsified product of the invention contains milk fat, the oil-in-water emulsified product becomes a so-called compound cream.

When the oil-in-water emulsified product of the invention contain milk fat, the total content of fat-and-oil ingredients derived from vegetable fats-and-oils, in all the fat-and-oil ingredients including the milk fat itself in the oil-in-water emulsified product, is preferably 10 to 90% by mass, more preferably 30 to 90% by mass, still more preferably 50 to 90% by mass, and the content of the milk fat is preferably 10 to 90% by mass, more preferably 10 to 70% by mass, still more preferably 10 to 50% by mass.

The oil-in-water emulsified product of the invention can contain another fat-and-oil, as a fat-and-oil ingredient other than fat-and-oil ingredients derived from the fat-and-oil composition of the invention. As another fat-and-oil, there can usually be used a fat-and-oil for oil-in-water emulsified products used as cream, particularly whipping cream.

The proportion of fat-and-oil ingredients derived from the fat-and-oil composition of the invention in all the fat-and-oil ingredients of the oil-in-water emulsified product of the invention is preferably 50 to 100% by mass, more preferably 70 to 100% by mass, still more preferably 80 to 100% by mass, and most preferably 90 to 100% by mass.

In the oil-in-water emulsified product of the invention, there can be compounded, as ingredients other than fat-and-oil ingredients, in addition to such ingredients other than fat-and-oil ingredients as mentioned hereinbefore and optionally compounded in the fat-and-oil composition of the invention, ingredients usually compounded in oil-in-water emulsified products, for example an emulsifier, milk solid no fat, a sugar, a stabilizer, a salt, etc. in an appropriate amount.

As the emulsifier, there can be mentioned so far known emulsifiers such as, for example, lecithin, glycerol fatty acid esters, sucrose fatty acid esters, propylene glycol fatty acid esters, sorbitan fatty acid esters, polyglycerol fatty acid esters and organic acid fatty acid esters.

As the milk solid no fat, there can, for example, be mentioned skim milk, skim milk powder, whey powder, sodium caseinate, etc. Part of the milk solid no fat can be replaced with a vegetable protein.

As the sugar, there can, for example, be mentioned glucose, maltose, sorbitol, sucrose, lactose, etc.

As the stabilizer, there can, for example, be mentioned xanthane gum, guar gum, etc.

As the salt, there can, for example, be mentioned sodium metaphosphate, alkali metal salts of phosphoric acid, alkali metal salts of citric acid, etc.

The oil-in-water emulsified product of the invention contains fat-and-oil ingredients, in a content of, preferably 20 to 50% by mass, more preferably 30 to 50% by mass, and still more preferably 40.5 to 50% by mass. Namely, in the oil-in-water emulsified product of the invention, it is possible to adjust the content of fat-and-oil ingredients to compounding of high fat-and-oil ingredients exceeding 40% by mass, and it is also possible to adjust it to compounding of low fat-and-oil ingredients.

The oil-in-water emulsified product of the invention has high emulsification stability, and is good in whipping characteristics such as melting mouthfeel, foaming properties and shape-retaining properties.

When the oil-in-water emulsified product of the invention contains milk fat, besides the above effects, the flavor of the oil-in-water emulsified product becomes better.

From the viewpoint that the oil-in-water emulsified product of the invention does not substantially contain trans fatty acids, the proportion of trans fatty acids in all the constitutive fatty acids of all the fat-and-oil ingredients contained in the oil-in-water emulsified product needs to be less than 5% by mass, and is preferably less than 3% by mass, more preferably less than 1% by mass, and most preferably 0% by mass.

The content of lauric acid in all the constitutive fatty acids of all the fat-and-oil ingredients derived from vegetable fats-and-oils, as contained in the oil-in-water emulsified product of the invention is preferably 0.2 to 2% by mass, more preferably 0.3 to 2% by mass, still more preferably 0.5 to 2% by mass and most preferably 1 to 2% by mass.

The preparation process of the oil-in-water emulsified product of the invention is not particularly restricted, and so far known processes can be used. For example, it can be prepared by preparing an oil phase containing the fat-and-oil composition of the invention and an aqueous phase, respectively, mixing the oil phase with the aqueous phase, and subjecting the resulting emulsified product to homogenization treatment. Further, if necessary, it is also possible to make pasteurization treatment. The homogenization treatment can be either of pre-homogenization made before the pasteurization treatment and post-homogenization made after the pasteurization treatment, and double homogenization can also be made wherein both of the pre-homogenization and the post-homogenization are combined.

The oil-in-water emulsified product of the invention in a case wherein milk fat is contained (compound cream) can be prepared by emulsifying an oil phase containing the fat-and-oil composition of the invention in a case wherein milk fat is contained and an aqueous phase. The compound cream can also be prepared by compounding fresh cream (cream prepared from only milk fat) in an aqueous phase, and emulsifying the aqueous phase and an oil phase containing the fat-and-oil composition of the invention. Further, the compound cream can also be prepared by emulsifying an oil phase containing the fat-and-oil composition of the invention and an aqueous phase, and mixing the resulting emulsified product with fresh cream.

The oil-in-water emulsified product of the invention can be used as foods such as cream, coffee whitener and ice cream, and, particularly, can suitably be used as cream.

The cream of the invention can suitably be used as whipping cream (which includes either of cream for whipping before foaming and whipped cream after foaming), and the whipping cream can suitably be used in foods of confectionery and bread-making fields such as cakes and breads.

The compounding composition of the whipping cream of the invention is, for example, preferably 20 to 50% by mass of fat-and-oil ingredients, 3 to 6% by mass of a milk solid no fat, 0.4 to 1.0% by mass of an emulsifier, 43.0 to 76.55% by mass of water and 0.05 to 0.30% by mass of a salt, more preferably 30 to 50% by mass of fat-and-oil ingredients, 3 to 6% by mass of a milk solid no fat, 0.4 to 1.0% by mass of an emulsifier, 44.25 to 65.55% by mass of water and 0.05 to 0.20% by mass of a salt, and still more preferably 40.5 to 50% by mass of fat-and-oil ingredients, 4 to 5% by mass of a milk solid no fat, 0.4 to 0.6% by mass of an emulsifier, 44.25 to 55.05% by mass of water and 0.05 to 0.15% by mass of a salt.

There can, if necessary, be added to the whipping cream a sugar, a stabilizer, a perfume, etc.

The cream of the invention can also be used suitably as a cooking cream such as a cream sauce without foaming.

The cream of the invention can be used in mixing with another vegetable cream.

EXAMPLES

The invention is specifically described below according to examples and comparative examples, but the invention is not limited thereby at all.
(Preparation of Transesterified Oils)
Transesterified Oil 1 (Fat-and-Oil A)
    A mixed oil obtained by mixing an extremely hardened oil of palm oil (prepared in The Nisshin OilliO Group, Ltd., fatty acid composition: the content of lauric acid 0% by mass) and an extremely hardened oil of palm kernel oil (prepared in The Nisshin OilliO Group, Ltd., fatty acid composition; the content of lauric acid: 46.9% by mass) at a ratio of 1:1 by mass was sufficiently dried with heating to 120° C. under reduced pressure, sodium methylate was added in an amount of 0.2% by mass of the dried mixed oil, and the mixture was subjected to transesterification reaction at 110° C. for 0.5 hour under reduced pressure and stirring. After the completion of the reaction, the sodium methylate was removed with water washing, and the resulting mixture was subjected to decolorization and deodorization treatments according to usual purification methods to obtain a transesterified oil 1 (fatty acid composition; the content of lauric acid: 23.3% by mass, the content of XOX-type triacyl glycerols: 0% by mass, the content of X2O-type triacyl glycerols: 0% by mass). The randomization proportion of the transesterified oil 1 (palmitic acid base) was 100%.
Transesterified Oil 2 (Fat-and-Oil B)
    Palmolein (trade name: Palmolein, made by The Nisshin OilliO Group, Ltd., fatty acid composition; the content of saturated fatty acids having 16 or more carbon atoms: 44.0% by mass, the content of unsaturated fatty acids having 16 or more carbon atoms: 53.7% by mass, the content of fatty acids having 14 or less carbon atoms: 1.2% by mass, iodine value: 56.4) was sufficiently dried with heating to 120° C. under reduced pressure, sodium methylate was added in an amount of 0.2% by mass of the dried palmolein, and the mixture was subjected to transesterification reaction at 110° C. for 0.5 hour under reduced pressure and stirring. After the completion of the reaction, the sodium methylate was removed with water washing, and the resulting mixture was subjected to decolorization and deodorization treatments according to usual purification methods to obtain a transesterified oil 2 (the content of XOX-type triacyl glycerols: 9.4% by mass, the content of X2O-type triacyl glycerols: 28.3% by mass). The randomization proportion (palmitic acid base) of the transesterified oil 2 was 100%.
(Preparation of Fat-and-Oil Compositions)
    Raw material fats-and-oils were mixed in a compounding proportion shown in Tables 1 and 2 to obtain the fat-and-oil compositions of Examples 1 to 5, and the fat-and-oil compositions of Comparative examples 1 to 5.
    As the raw material fats-and-oils shown in Tables 1 and 2, the following were used.
Extremely Hardened Oil of Coconut Oil (Fat-and-Oil A)
    (trade name: Yashiko 34, made by The Nisshin OilliO Group, Ltd., fatty acid composition; the content of lauric acid: 46.7% by mass, the content of XOX-type triacyl glycerols: 0% by mass, the content of X2O-type triacyl glycerols: 0% by mass)
Coconut Oil (Fat-and-Oil A)
    (trade name: Purified Coconut Oil, made by The Nisshin OilliO Group, Ltd., fatty acid composition; the content of lauric acid: 46.7% by mass, the content of XOX-type triacyl glycerols: 0% by mass, the content of X2O-type triacyl glycerols: 0% by mass)
Palm Oil (Fat-and-Oil D)
    (trade name: Purified Palm Oil, made by The Nisshin OilliO Group, Ltd., SFC: 10° C. 53.8%, 20° C. 20.3%, 35° C. 5.4%, the content of XOX-type triacyl glycerols: 32.8% by mass, the content of X2O-type triacyl glycerols: 37.1% by mass)
PMF (Fat-and-Oil D)
    (product from the iodine value 45 process in Malaysia ISF Co., SFC: 10° C. 75.3%, 20° C. 49.7%, 35° C. 0.0%, fatty acid composition; the content of saturated fatty acids having 16 or more carbon atoms: 53.4% by mass, the content of unsaturated fatty acids having 16 or more carbon atoms: 45.2% by mass, the content of fatty acids having 14 or less carbon atoms: 1.2% by mass, iodine value: 45.4, the content of XOX-type triacyl glycerols: 55.1% by mass, the content of X2O-type triacyl glycerols: 59.5% by mass)
Hard PMF (Fat-and-Oil D)
    (made by Malaysia ISF Co., SFC: 10° C. 94.1%, 20° C. 85.9%, 35° C. 0%, fatty acid composition; the content of saturated fatty acids having 16 or more carbon atoms: 63.3% by mass, the content of unsaturated fatty acids having 16 or more carbon atoms: 35.8% by mass, the content of fatty acids having 14 or less carbon atoms: 0.9% by mass, iodine value; 33, the content of XOX-type triacyl glycerols: 78.6% by mass, the content of X2O-type triacyl glycerols: 83.6% by mass)

The fatty acid compositions of the raw material fats-and-oils of fat-and-oil compositions were measured according to a gas chromatography (according to AOCS Celf-96).

(Measurement of SFC of a Fat-and-Oil Composition, Trans Fatty Acid Content in a Fat-and-Oil Composition, Lauric Acid Content in a Fat-and-Oil Composition, and XOX-Type Triacyl Glycerol Content in a Fat-and-Oil Composition)

Solid fat content (SFC) values at each temperature (10° C., 15° C., 30° C.) of the fat-and-oil compositions of the examples and the comparative examples were measured according to 2.2.9-2003 Solid Fat Content (NMR method) of "Kijun Yushi Bunseki Shikenho" (Standard Methods for the Analysis of Fats, Oils and Related Materials) edited by a corporate juridical person Japan Oil Chemists' Society.

Trans fatty acid contents and lauric acid contents in the fat-and-oil compositions of the examples and the comparative examples were measured according to a gas chromatography (according to AOCS Celf-96).

The contents of XOX-type triacyl glycerols (XOX-type TAG) in all the fat-and-oil ingredients derived from vegetable fats-and-oils in the fat-and-oil compositions of the examples and the comparative examples were calculated according to the following 1) to 3).
1) "X2O-type TAG content" was measured according to a gas chromatography (according to the method of JAOCS. vol. 70, 11, 1111-1114 (1993)).
2) "Mass ratio of XXO-type TAG and XOX-type TAG (XXO-type TAG: XOX-type TAG)" was measured according to a silver ion column-HPLC method (according to the method of J. High Resolut, Chromatogr., 18, 105-107 (1995)).
3) "XOX-type TAG content" was calculated using the X2O-type TAG content measured in 1) and the mass ratio of XXO-type TAG and XOX-type TAG measured in 2) (for example, when the X2O-type TAG content is 50% by mass and the mass ratio of XXO-type TAG and XOX-type TAG is 1:3, the XOX-type TAG content becomes 50% by mass× 3/4=37.5% by mass).

The measurement results of SFC values of the fat-and-oil compositions, trans fatty acid contents in the fat-and-oil compositions, lauric acid contents in the fat-and-oil compositions and XOX-type TAG contents in the fat-and-oil compositions are shown together in Tables 1 and 2.

TABLE 1

Compositions of fat-and-oil compositions, trans fatty acid and lauric acid contents, SFC, and cream evaluation results

| Fat-and-oil composition | | Example 1 | Example 2 | Example 3 | Example 4 | Example 5 |
|---|---|---|---|---|---|---|
| Composition of fat-and-oil composition (% by mass) | Extremely hardened oil of coconut oil | 0 | 4 | 0 | 0 | 2 |
| | Coconut oil | 0 | 0 | 0 | 0 | 0 |
| | Transesterified oil 1 | 2 | 0 | 4 | 2 | 0 |
| | Transesterified oil 2 | 13 | 11 | 11 | 20 | 20 |
| | Palm oil | 20 | 20 | 20 | 0 | 10 |
| | PMF | 65 | 65 | 65 | 78 | 68 |
| | Hard PMF | 0 | 0 | 0 | 0 | 0 |
| XOX-type TAG content in the fat-and-oil composition (% by mass) | | 43.6 | 43.4 | 43.4 | 44.9 | 42.6 |
| Trans fatty acid content in all the constitutive fatty acids of all the fat-and-oil ingredients in the fat-and-oil composition (% by mass) | | 0.6 | 0.5 | 0.5 | 0.6 | 0.6 |
| Lauric acid content in all the constitutive fatty acids of all the fat-and-oil ingredients in the fat-and-oil composition (% by mass) | | 0.5 | 1.9 | 0.9 | 0.5 | 0.9 |
| SFC of the fat-and-oil composition (%) | 10° C. | 65.3 | 61.3 | 66.1 | 68.0 | 63.3 |
| | 15° C. | 52.4 | 48.8 | 53.3 | 55.9 | 50.1 |
| | 30° C. | 5.7 | 5.9 | 6.9 | 5.7 | 5.3 |

| Cream | | Example 6 | Example 7 | Example 8 | Example 9 | Example 10 |
|---|---|---|---|---|---|---|
| The content of fat-and-oil ingredients in the cream (% by mass) | | 44.5 | 44.5 | 44.5 | 44.5 | 44.5 |
| Proportion of trans fatty acids in all the constitutive fatty acids of all the fat-and-oil ingredients in the cream (% by mass) | | 0.6 | 0.5 | 0.5 | 0.6 | 0.6 |
| Evaluation results of the cream | Emulsification stability (second) | 180 | 120 | 120 | 120 | 120 |
| | Overrun | 170 | 155 | 165 | 167 | 161 |
| | Shape-retaining properties | ○ | ◎ | ○ | ○ | ◎ |
| | Flower form making properties | ◎ | ◎ | ◎ | ◎ | ◎ |
| | Dripping of water | ○ | ◎ | ○ | ○ | ◎ |
| | Melting mouthfeel | 5 | 5 | 4 | 5 | 4 |

TABLE 2

Compositions of fat-and-oil compositions, trans fatty acid and lauric acid contents, SFC, and cream evaluation results

| Fat-and-oil composition | | Com. ex. 1 | Com. ex. 2 | Com. ex. 3 | Com. ex. 4 | Com. ex. 5 |
|---|---|---|---|---|---|---|
| Composition of fat-and-oil composition (% by mass) | Extremely hardened oil of coconut oil | 0 | 2 | 0 | 2 | 2 |
| | Coconut oil | 0 | 0 | 6 | 0 | 0 |
| | Transesterified oil 1 | 0 | 0 | 0 | 0 | 0 |
| | Transesterified oil 2 | 0 | 20 | 15 | 8 | 12 |
| | Palm oil | 0 | 78 | 0 | 0 | 0 |
| | PMF | 100 | 0 | 79 | 0 | 0 |
| | Hard PMF | 0 | 0 | 0 | 90 | 86 |
| XOX-type TAG content in the fat-and-oil composition (% by mass) | | 55.1 | 27.5 | 44.9 | 71.5 | 68.7 |
| Trans fatty acid content in all the constitutive fatty acids of all the fat-and-oil ingredients in the fat-and-oil composition (% by mass) | | 0.5 | 0.6 | 0.5 | 0.2 | 0.2 |
| Lauric acid content in all the constitutive fatty acids of all the fat-and-oil ingredients in the fat-and-oil composition (% by mass) | | 0 | 0.9 | 2.8 | 0.9 | 0.9 |
| SFC of the fat-and-oil composition (%) | 10° C. | 74.4 | 44.2 | 66.3 | 91.3 | 90.1 |
| | 15° C. | 62.4 | 29.9 | 52.7 | 87.4 | 85.5 |
| | 30° C. | 2.8 | 8.6 | 3.7 | 16.3 | 15.3 |

| Cream | | Com. ex. 6 | Com. ex. 7 | Com. ex. 8 | Com. ex. 9 | Com. ex. 10 |
|---|---|---|---|---|---|---|
| The content of fat-and-oil ingredients in the cream (% by mass) | | 44.5 | 44.5 | 44.5 | 44.5 | 44.5 |
| Proportion of trans fatty acids in all the constitutive fatty acids of all the fat-and-oil ingredients in the cream (% by mass) | | 0.5 | 0.6 | 0.5 | 0.2 | 0.2 |
| Evaluation results of the cream | Emulsification stability (second) | 2 | 100 | 130 | 0 | 0 |
| | Overrun | E. imp. | 160 | 165 | E. imp. | E. imp. |
| | Shape-retaining properties | E. imp. | Δ | X | E. imp. | E. imp. |
| | Flower form making properties | E. imp. | Δ | ○ | E. imp. | E. imp. |
| | Dripping of water | E. imp. | X | X | E. imp. | E. imp. |
| | Melting mouthfeel | E. imp. | 1 | 5 | E. imp. | E. imp. |

In Table 2, Com.ex. means Comparative example and E.imp. means Evaluation impossible.

(Preparation of Creams)

The fat-and-oil compositions of Examples 1 to 5 and the fat-and-oil compositions of Comparative examples 1 to 5 were used as fats-and-oils for creams, and creams were prepared using the compounding as shown in Table 3 and according to the following process.

Soybean lecithin, a glycerol fatty acid ester, a sorbitan fatty acid ester, a sucrose fatty acid ester and a perfume were dissolved or dispersed in one of the fats-and-oils to prepare an oil phase. Separately, skim milk powder and sodium metaphosphate were dissolved or dispersed in water to prepare an aqueous phase. The prepared oil phase was added to the prepared aqueous phase, and the mixture was preliminarily emulsified by a homomixer while the temperature of the mixture was adjusted to 60 to 70° C. After the preliminary emulsification, the mixture was homogenized under a pressure of 6.0 MPa, subjected to batch pasteurization at 85° C. for 15 minutes, cooled to about 10° C. and aged for about 18 hours in a refrigerator of 5° C. to obtain creams of Examples 6 to 10 and creams of Comparative examples 6 to 10.

TABLE 3

Compounding in creams (% by mass)

| Cream | Examples 6 to 10 and Comparative examples 6 to 10 |
|---|---|
| Fat-and-oil (one of the fat-and-oil compositions of the examples and the comparative examples) | 44.5 |
| Soybean lecithin | 0.25 |
| Glycerol fatty acid ester | 0.0625 |
| Sorbitan fatty acid ester | 0.0625 |
| Sucrose fatty acid ester | 0.125 |
| Perfume | 0.1 |
| Skim milk powder | 4.5 |
| Sodium metaphosphate | 0.1 |
| Water | 50.3 |
| Total | 100 |

The creams of Examples 6 to 10 and the creams of Comparative examples 6 to 10 were evaluated on emulsification stability and whipping cream characteristics (overrun, shape-retaining properties, flower form making properties, dripping of water and melting mouthfeel) according to the following evaluation methods. The results are shown in Table 1 and Table 2.

<Emulsification Stability>

Each 60 g of the creams was weighed out in beakers, respectively, the temperature of the cream was adjusted to 20° C., a propeller of four blades was rotated at 160 rpm by a Three-One Motor, and time needed till the cream is coagulated or its viscosity is increased (so-called plasticized) was measured. It is meant that the longer the time needed till the cream is coagulated or its viscosity is increased is, the higher its emulsification stability is. The time needed till the cream is coagulated and its viscosity is increased is, usually, preferably 120 seconds or more.

<Whipping Cream Characteristics>

The creams of Examples 6 to 10 and the creams of Comparative examples 6 to 10 were used, and their whipping cream characteristics were evaluated.

35 g of sugar was added to 500 g of each of the creams and the mixture was whipped at the intermediate speed 2 in HOBART Mixers (made by HOBART JAPAN). As to the resulting whipped cream, overrun, shape-retaining properties, flower form making properties, dripping of water and melting mouthfeel were evaluated.

(Overrun)

As to each of the creams, the proportion of the increased volume of the cream (overrun (%)) was calculated. It is meant that the larger the value of overrun is, the better foaming properties are. Overrun is, usually, preferably 80 to 220%.

Overrun (%)=[(mass of a cream of a definite volume before the whipping−mass of a cream of the definite volume after the whipping)/(mass of a cream of the definite volume after the whipping)]×100

(Shape-Retaining Properties)

Each of the whipped creams was put in a squeezing pouch and squeezed out into a flower form, and preserved at 20° C. for 3 hours. The appearance of the whipped cream after the preservation was evaluated according to the following four-stage criterion.

◎: There is no lost shape and shape-retaining properties are very good.
○: There is almost no lost shape and shape-retaining properties are good.
Δ: Such a state that there is a little lost shape
×: Such a state that there is large lost shape (Flower Form Making Properties)

Each of the whipped creams was put in a squeezing pouch and squeezed out into a flower form, and the appearance of the whipped cream at that time was evaluated according to the following four-stage criterion.

◎: Such a very good state that the surface is smooth and has gloss and the edge is sharp
○: Good
Δ: Such a state that roughness is observed on the surface and the edge is somewhat flat
×: Such a state that there is roughness and the whipped cream becomes soft as a whole (Dripping of Water)

Each of the whipped creams was preserved at 5° C. for 24 hours, and dripping of water from the whipped cream was evaluated according to the following criterion.

◎: There is no dripping of water.
○: There is almost no dripping of water.
Δ: There is some dripping of water.
×: There is much dripping of water.

(Melting Mouthfeel)

Each of the whipped creams was eaten by a panel of 10 specialized members, the preference of melting mouthfeel at the eating was graded according to five-stage criterion of 1 to 5, and the melting mouthfeel of the whipped creams was evaluated from the average mark of the 10 members. It is meant that the higher the average mark is, the better the melting mouthfeel is, and the lower the average mark is, the worse the melting mouthfeel is.

As understood from Table 1, the creams of Examples 6 to 10 have satisfactory emulsification stability although they are creams having such a high fat-and-oil content that the content of the fat-and-oil ingredients exceeds 40% by mass.

Furthermore, the creams of Examples 6 to 10 were excellent in foaming properties, and the whipped creams after the whipping were satisfactory in shape-retaining properties, flower form making properties, dripping of water and melting mouthfeel.

On the other hand, as understood from Table 2, the cream of Comparative example 6 wherein only the middle-melting fractionated oil of palm oil was used as a raw material fat-and-oil was impossible in evaluation. In Table 2, "Evaluation impossible" means that the cream became a "plasticized state". The "plasticized state" is a term in the industry expressing such a state that fluidity is lost and whipping is impossible.

The cream of Comparative example 7 obtained using the fat-and-oil composition of Comparative example 2 wherein the content of XOX-type triacyl glycerols is less than the lower limit was not satisfactory particularly in dripping of water and melting mouthfeel.

The cream of Comparative example 8 obtained using the fat-and-oil composition of Comparative example 3 wherein the content of lauric fats-and-oils (fat-and-oil A) is more than the upper limit was not satisfactory in shape-retaining properties and dripping of water.

The cream of Comparative example 9 obtained using the fat-and-oil composition of Comparative example 4 wherein the content of the transesterified oil (fat-and-oil B) is less than the lower limit and the content of XOX-type triacyl glycerols is more than the upper limit was impossible in evaluation.

The cream of Comparative example 10 obtained using the fat-and-oil composition of Comparative example 5 wherein the content of XOX-type triacyl glycerols is more than the upper limit was impossible in evaluation.

(Preparation and Evaluation of Cream and Compound Cream)

Cream of Example 11 was prepared according to the same process as the above-mentioned process using the fat-and-oil composition of Example 1 and the compounding shown in Table 4. The content of trans fatty acids in all the constitutive fatty acids of all the fat-and-oil ingredients in this cream was 0.6% by mass. The cream of Example 11 was evaluated on emulsification stability and whipping cream characteristics (overrun, shape-retaining properties, flower form making properties, dripping of water and melting mouthfeel) in the same evaluation way as mentioned above. The results of the evaluation are shown in Table 4.

The compound cream of Example 12 was obtained by mixing the cream of Example 11 with fresh cream (fat content 40.5% by mass) at a mass ratio of 6 (the cream of Example 11):4 (fresh cream) (the content of trans fatty acids in all the constitutive fatty acids of all the fat-and-oil ingredients in the compound cream of Example 12: 2.2% by mass). The total content of fat-and-oil ingredients derived from vegetable fats-and-oils in all the fat-and-oil ingredients contained in the compound cream of Example 12 was 60.0% by mass, and the content of milk fat in all the fat-and-oil ingredients was 40.0% by mass. The compound cream of Example 12 was evaluated on emulsification stability and whipping cream characteristics. The results are shown in Table 5.

TABLE 4

Composition of the cream of Example 11 and evaluation results

| | | |
|---|---|---|
| Composition of the cream (% by mass) | Fat-and-oil (the fat-and-oil composition of Example 1) | 40.5 |
| | Soybean lecithin | 0.25 |
| | Glycerol fatty acid ester | 0.0625 |
| | Sorbitan fatty acid ester | 0.0625 |
| | Sucrose fatty acid ester | 0.125 |
| | Perfume | 0.1 |
| | Skim milk powder | 4.5 |
| | Sodium metaphosphate | 0.1 |
| | Water | 54.3 |
| | Total | 100 |
| Evaluation results of the cream | Emulsification stability (second) | 300 |
| | Overrun (%) | 150 |
| | Shape-retaining properties | ◎ |
| | Flower form making properties | ◎ |
| | Dripping of water | ◎ |
| | Melting mouthfeel | 5 |

TABLE 5

Results of compound cream evaluation

| | |
|---|---|
| Compound cream | Example 12 |
| Used cream | Example 11 |
| Emulsification stability (second) | 500 |
| Overrun (%) | 136 |
| Shape-retaining properties | ◎ |
| Flower form making properties | ◎ |
| Dripping of water | ◎ |
| Melting mouthfeel | 5 |

As understood from Table 4, the cream of Example 11 was satisfactory in emulsification stability although it is a cream having such a high fat-and-oil content that the content of the fat-and-oil ingredients exceeds 40% by mass.

Furthermore, the cream of Example 11 was excellent in foaming properties, and the whipped cream after the whipping was satisfactory in shape-retaining properties, flower form making properties, dripping of water and melting mouthfeel.

As understood from Table 5, the compound cream of Example 12 has high emulsification stability and was excellent.

Furthermore, the cream of Example 12 was excellent in foaming properties, and the whipped cream after the whipping was satisfactory enough in shape-retaining properties, flower form making properties, dripping of water and melting mouthfeel.

The invention claimed is:

1. A fat-and-oil composition comprising a fat-and-oil A, a fat-and-oil B, a fat-and-oil D and an optional fat-and-oil E all of which are derived from vegetable fats-and-oils, wherein fat-and-oil E when present becomes the residual fat-and-oil ingredient when the total content of fat-and-oil A, fat-and-oil B and fat-and-oil D in all the fat-and-oil ingredients derived from vegetable fats-and-oils is less than 100% by mass, and fat-and-oil A is at least one fat-and-oil selected from the group consisting of:
(1) lauric fats-and-oils,
(2) fractionated oils of lauric fats-and-oils,
(3) extremely hardened oils of lauric fats-and-oils, and
(4) transesterified oils each of which is obtained by subjecting to transesterification reaction a fat-and-oil containing at least one fat-and-oil of lauric fats-and-oils, fractionated oils of lauric fats-and-oils and extremely hardened oils of lauric fats-and-oils, and wherein the content of lauric acid in all the constitutive fatty acids is 15 to 60% by mass, fat-and-oil B is a transesterified oil obtained by subjecting the following fat-and-oil C as derived from vegetable fats-and-oils to transesterification reaction, fat-and-oil C is a fat-and-oil wherein the content of saturated fatty acids having 16 or more carbon atoms in all the constitutive fatty acids is 20% by mass or more but less than 75% by mass, and the content of unsaturated fatty acids having 16 or more carbon atoms in all the constitutive fatty acids is 25% by mass or more but less than 70% by mass, and fat-and-oil D is a fat-and-oil which contains XOX-type triacyl glycerols in a content of 30% by mass or more, wherein XOX-type triacyl glycerol; a triacyl glycerol wherein the fatty acids at the 1-position and the 3-position of the triacyl glycerol are X and the fatty acid at the 2-position is O, X; a saturated fatty acid having 16 or more carbon atoms, O; oleic acid, and fat-and-oil E is a fat-and-oil ingredient which is derived from vegetable fats and oils and does not belong to any of fat-and-oil A, fat-and-oil B or fat-and-oil D, and provided that
(a) the content of fat-and-oil A in all the fat-and-oil ingredients derived from vegetable fats and oils is 1 to 4% by mass,
(b) the content of fat-and-oil B in all the fat-and-oil ingredients derived from vegetable fats and oils is 10 to 20% by mass, and
(c) the content of XOX-type triacyl glycerols in all the fat-and-oil ingredients derived from vegetable fats and oils is 40% by mass or more but less than 60% by mass.

2. The fat-and-oil composition according to claim 1 wherein fat-and-oil C is a fractionated oil of palm oil and the fractionated oil has an iodine value of 55 to 71.

3. The fat-and-oil composition according to claim 1 which contains milk fat and the content of milk fat in all the fat-and-oil ingredients in the fat-and-oil composition is 10 to 90% by mass.

4. The fat-and-oil composition according to claim 1 wherein the fat-and-oil composition is used for preparation of creams.

5. An oil-in-water emulsified product which contains the fat-and-oil composition according to claim 1 and wherein the proportion of trans fatty acids in all the constitutive fatty acids of all the fat-and-oil ingredients in the oil-in-water emulsified product is less than 5% by mass.

6. The oil-in-water emulsified product according to claim 5 which contains milk fat and wherein the content of the milk fat in all the fat-and-oil ingredients in the oil-in-water emulsified product is 10 to 90% by mass.

7. The oil-in-water emulsified product according to claim 5 wherein the content of all the fat-and-oil ingredients in the oil-in-water emulsified product is more than 40% by mass.

8. The oil-in-water emulsified product according to claim 5 wherein the oil-in-water emulsified product is cream.

9. The oil-in-water emulsified product according to claim 8 wherein the cream is whipping cream.

10. A food comprising the oil-in-water emulsified product according to claim 5.

* * * * *